Nov. 11, 1930.  J. M. WILSON  1,781,091
PIPE JOINT
Original Filed July 19, 1924
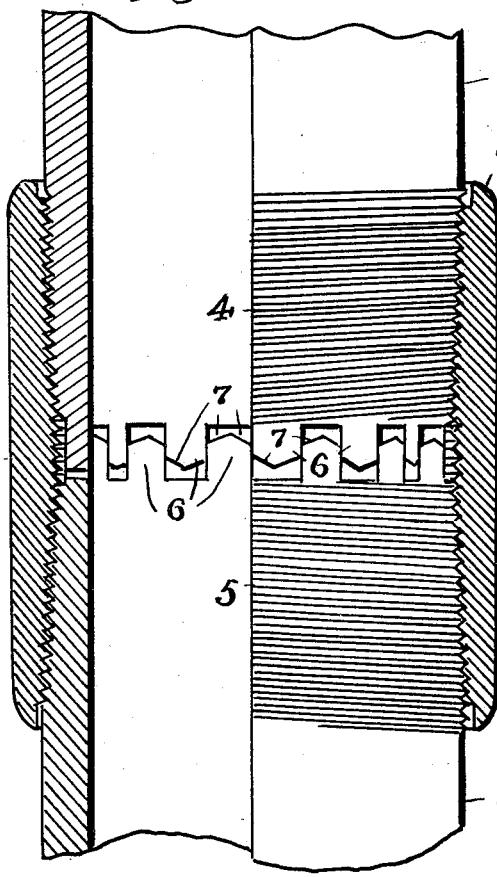
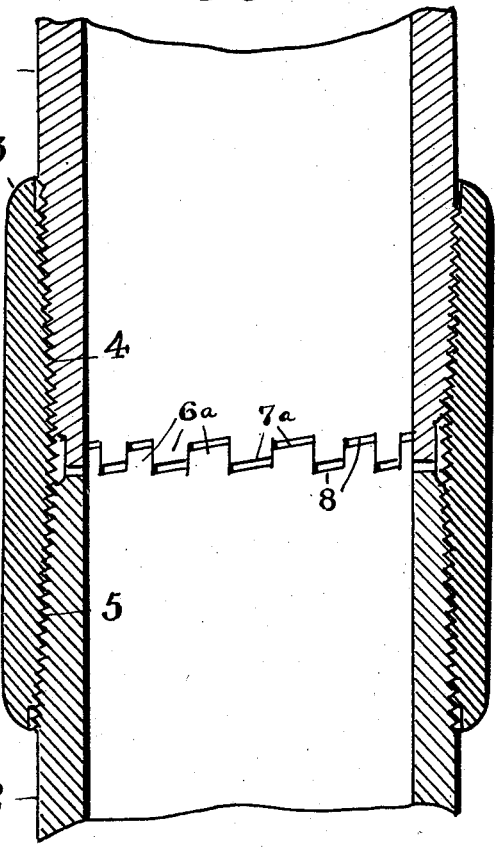
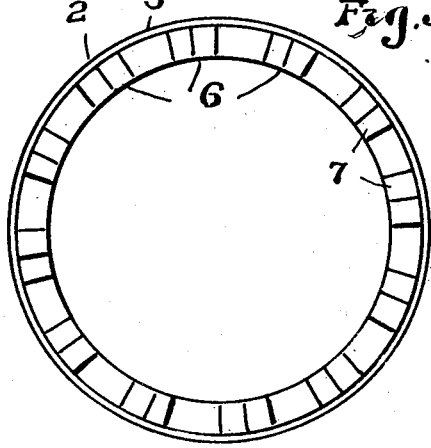
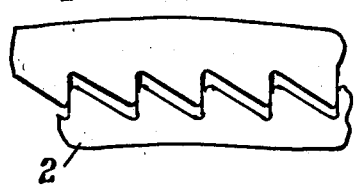
INVENTOR
John M. Wilson
by F. N. Barber
Attorney Patented Nov. 11, 1930

1,781,091

UNITED STATES PATENT OFFICE

JOHN M. WILSON, OF PITTSBURGH, PENNSYLVANIA, ASSIGNOR TO THE NATIONAL SUPPLY COMPANY, OF TOLEDO, OHIO, A CORPORATION OF OHIO

PIPE JOINT

Application filed July 19, 1924, Serial No. 726,952. Renewed January 24, 1928.

My invention relates to pipe joints designed particularly for drill pipe for wells, though it may be applied to other uses.

In the process of rotary drilling of wells, the drill stem has three duties. First, it must transmit the torsional strains from the rotary on the derrick floor to the drill at the bottom of the hole being drilled. Second, the joints of the stem must be sufficiently strong to hold its weight and also to pull the bit or stem out of the hole in case it becomes stuck therein. Third, the joints must be water tight under an internal hydraulic pressure often in excess of one thousand pounds per square inch.

The pipe sections of the present drill stems with which I am acquainted are coupled together with a coupling internally threaded in a right-hand direction, the ends of the two pipes screwed into the ends of the coupling being provided with right-hand threads. If these threads are tapered they will fulfil the last two of said duties, but straight threads will not accomplish either of these duties. Neither type of thread alone fulfils the first of said duties satisfactorily. The torsional strains tend to screw the pipe further into the coupling, and ultimately results in galling the threads and bringing the ends of the pipe together so that the strains tend to pull the coupling in two or strip the threads.

It is the object of the present invention to provide a joint for a drill stem or equivalent device which will fulfil all three of the said duties. This object I accomplish by providing the joint with right and left tapered threads to fulfil the last two of said duties and the ends of the pipe with interlocking teeth to fulfil the first of said duties, all as hereinafter more fully described and claimed.

Referring to the accompanying drawing, Fig. 1 shows a pipe-joint made in accordance with the principles of my invention, the two pipes being half in side elevation and half in longitudinal section and the coupling being shown in central longitudinal section. Fig. 2 is a central longitudinal section showing my pipe-joint with a modification of teeth. Fig. 3 is an end view of one of the pipes. Fig. 4 is a development of a fragment of two pipes with a second modified form of teeth.

On Figs. 1 and 3 of the drawing, 1 and 2 designate two pipes arranged in axial alinement and connected together by the coupling 3. The ends of the pipes are tapered externally and the tapered portions are provided with screw threads, one pipe having right-hand threads 4 and the other left-hand threads 5. The coupling 3 is internally tapered from each end toward its central portion to correspond to the taper on the pipes. The tapered surfaces in the coupling are oppositely threaded to correspond to the oppositely threaded ends on the pipes.

The opposing ends of the pipes are provided with interfitting teeth 6 of similar shape and dimensions, the teeth on one pipe fitting between the teeth on the other pipe. Preferably the ends of the teeth are beveled so as to automatically guide them into their normal or interfitting positions. In Figs. 1 and 3 the teeth 6 have each bevels 7 toward each edge, while the teeth 6ª in Fig. 2 have only a single bevel 7ª. When a single bevel is used, as in Fig. 2, the bases 8 between the teeth are preferably beveled to correspond to the bevel of the teeth, so as to provide a maximum of longitudinal adjustment of the pipes in the coupling.

Preferably the lateral edges of the teeth are substantially parallel with the pipes, so that the torsional power applied by one pipe of the joint to the other pipe thereof will not be borne by the threads. Any wide deviation of the parallelism of the tooth edge and the pipe axis would produce a longitudinal strain on the joint and might break or distort it. Preferably both edges of each tooth is made substantially parallel with the pipe axis so that the torsional strains will not be transmitted to the threads when the torque is applied in either direction. However, only one edge of each tooth need be parallel with the pipe axis as shown in Fig. 4, when the torque is to be applied in only one direction, or the reverse torque is not large enough to damage the joint.

It is important that, when the pipes are drawn toward each other tightly, for example, tight enough to make a water-tight fit, the ends of the teeth do not touch the bases between the teeth. In fact, the spaces between the ends of the teeth and the bases should at that time be ample to allow the coupling to be adjusted from time to time to take up any slack which may develop. This adjustment will move the pipe ends closer together. These spaces should be ample to provide for maximum total adjustments.

It is necessary also that the coupling and pipe ends have right and left threads, since otherwise the teeth on the ends of the pipe could not be drawn together in interlocking position.

The diameter of the pipes should just beyond the ends of the coupling be such as to permit them to enter the couplings further in adjusting the pipe ends in the couplings. The pipes should have no shoulders which will engage the ends of the coupling and thereby prevent the drawing of the pipe ends further into the coupling.

I claim—

1. In a rotary stem for drilling wells, two axially alined pipes having externally tapered and oppositely threaded ends provided with terminal interlocking teeth, whose interlocking sides are substantially parallel with the pipes, and a coupling screwed on the ends of the pipes and having its ends internally oppositely tapered and threaded to correspond to the tapers and threads on the ends of the pipes, the free ends of the teeth being beveled.

2. In a rotary stem for drilling wells, two axially alined pipes having externally tapered and oppositely threaded ends provided with interlocking teeth, and a coupling screwed on the ends of the pipes and having its ends internally oppositely tapered and threaded to correspond to the tapers and threads on the ends of the pipes, the free ends of the teeth being beveled, the lines of interengagement between one tooth and the two teeth contiguous thereto not deviating from parallelism with the axial centers of the pipes so that torsional power applied by the driving pipe will produce strain on the threads of the coupling or of a pipe end.

3. In a rotary stem for drilling wells, two axially alined pipes having externally tapered and oppositely threaded ends provided with interlocking teeth, and a coupling screwed on the ends of the pipes and having its ends internally oppositely tapered and threaded to correspond to the tapers and threads on the ends of the pipes, the ends of the teeth on one pipe being spaced from the bases between the teeth on the other pipe, and the diameter of the ends of the pipes immediately beyond the coupling being such as to permit the longitudinal adjustment of the pipes further into the coupling.

4. In a rotary stem for drilling wells, two axially alined pipes having externally tapered and oppositely threaded ends provided with interlocking teeth, whose interlocking sides are parallel with the pipes, and a coupling screwed on the ends of the pipes and having its ends internally oppositely tapered and threaded to correspond to the tapers and threads on the ends of the pipes, the free ends of the teeth being beveled, the ends of the teeth on one pipe being spaced from the bases between the teeth on the other pipe, and the diameter of the ends of the pipes immediately beyond the coupling being such as to permit the longitudinal adjustment of the pipes further into the coupling.

In testimony whereof, I hereunto affix my signature this 16th day of July, 1924.

JOHN M. WILSON.